(12) United States Patent
Rom et al.

(10) Patent No.: US 12,068,818 B2
(45) Date of Patent: Aug. 20, 2024

(54) ANTENNA PANEL MANAGEMENT

(71) Applicant: Nokia Technologies Oy, Espoo (FI)

(72) Inventors: Christian Rom, Aalborg (DK); Samantha Caporal Del Barrio, Aalborg (DK); Simon Svendsen, Aalborg (DK); Johannes Harrebek, Aalborg (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 77 days.

(21) Appl. No.: 17/858,497

(22) Filed: Jul. 6, 2022

(65) Prior Publication Data

US 2023/0011877 A1      Jan. 12, 2023

(30) Foreign Application Priority Data

Jul. 8, 2021   (EP) .................................... 21184512

(51) Int. Cl.
| | |
|---|---|
| *H04L 1/02* | (2006.01) |
| *H04B 7/06* | (2006.01) |
| *H04B 7/08* | (2006.01) |

(52) U.S. Cl.
CPC ......... *H04B 7/0602* (2013.01); *H04B 7/0822* (2013.01)

(58) Field of Classification Search
CPC ................ H04B 7/0404; H04B 7/0691; H04B 7/0874; H04B 7/0617; H04B 7/0695;
(Continued)

(56) References Cited

U.S. PATENT DOCUMENTS

| 10,624,038 B2 | 4/2020 | Lim et al. |
| 10,660,048 B2 | 5/2020 | MolavianJazi et al. |

(Continued)

FOREIGN PATENT DOCUMENTS

| WO | WO 2019/193581 A2 | 10/2019 |
| WO | WO 2021/098965 A1 | 5/2021 |

OTHER PUBLICATIONS

Nokia et al. R1-1813490. "Enhancements on Multi-beam Operation", 3GPP TSG RAN WG1, Meeting #95, Spokane WA US, Nov. 12-16, 2018, [Nov. 11, 2018], XP51555546.
(Continued)

*Primary Examiner* — Khai Tran
(74) *Attorney, Agent, or Firm* — Lippes Mathias LLP

(57) ABSTRACT

Aspects and embodiments relate to an apparatus and method for performing antenna panel management. There is provided an apparatus comprising: means for obtaining signal reception information related to at least one downlink signal received by a user equipment using at least one reception antenna panel of a plurality of selectively-activatable antenna panels; means for determining an indication of effective power radiatable to the network node from which the downlink signal is received, based on the signal reception information related to the at least one downlink signal received by that to antenna panel for each of the plurality of selectively-activatable antenna panels which is configurable to transmit a signal to a network node from which the downlink signal is received; means for calculating an indication of power consumption associated with the indication of effective power radiatable to the network node for each of the plurality of selectively-activatable antenna panels; and means for selecting and configuring at least one of the selectively-activatable antenna panels to be used for transmission of a signal to a network node from which the downlink signal is received in response to the calculated
(Continued)

indication of power consumption. Aspects support appropriate power efficient operation of a communication apparatus, for example by allowing for differentiated uplink and downlink antenna panel selection, which can enable apparatus power saving, whilst minimising performance loss, or incurring no significant performance loss.

16 Claims, 6 Drawing Sheets

(58) Field of Classification Search
CPC ................ H04B 7/0608; H04W 16/28; H04W 52/0245; H04W 72/542; H04W 52/02; H04W 52/0229; H01Q 1/243; H01Q 21/28
USPC .......................................... 375/267, 260, 262
See application file for complete search history.

(56) References Cited

U.S. PATENT DOCUMENTS

| | | |
|---|---|---|
| 2020/0059867 A1 | 2/2020 | Haghighat et al. |
| 2020/0120604 A1* | 4/2020 | Nam ..................... H04W 76/28 |
| 2020/0245266 A1 | 7/2020 | Loehr et al. |
| 2020/0350976 A1 | 11/2020 | Bai et al. |
| 2021/0153215 A1* | 5/2021 | Guan .................... H04L 67/303 |
| 2022/0247461 A1* | 8/2022 | Zhang ................. H04W 72/543 |
| 2023/0246681 A1* | 8/2023 | Takano ................ H04B 7/0602 |
| | | 455/101 |

OTHER PUBLICATIONS

Amani, et al."Multi-Panel Sparse Base Station Design with Physical Antenna Effectis in Massive Mu-Mimo", IEEE V. 69, N. 6, Jun. 2020, p. 6500-6510.

* cited by examiner

ANTENNA PANEL MANAGEMENT

The present application claims priority to European Application No. EP 21184512.8 filed Jul. 8, 2021.

TECHNOLOGICAL FIELD

Various example embodiments relate to an apparatus and method for performing antenna panel management.

BACKGROUND

In some wireless telecommunication networks, the nature of a frequency range upon which communication may take place, for example, frequency range 2 (FR2) is such that base stations and user equipment operate using relatively narrow beams. Communication nodes, such as base stations and user equipment, may be configured such that increased array/antenna gain can compensate for higher path loss which may occur when using mmWaves (for example, if operating at frequency range 2 or above).

In order to provide an ability to communicate effectively within a network, for example, to provide a "sphere" of communication coverage around user equipment, some user equipment have multiple antenna panels. It will be understood that each antenna panel may require appropriate configuration in order to allow user equipment to effectively and efficiently communicate within a network.

Although techniques for managing antenna panels while supporting communication within a network exist, unexpected consequences can occur particularly in terms of power consumption. Accordingly, it is desired to provide an improved technique for effectively managing antenna panels.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: means for obtaining signal reception information related to at least one downlink signal received by a user equipment using at least one reception antenna panel of a plurality of selectively-activatable antenna panels; means for determining an indication of effective power radiatable to the network node from which the downlink signal is received, based on the signal reception information related to the at least one downlink signal received by that antenna panel for each of the plurality of selectively-activatable antenna panels which is configurable to transmit a signal to a network node from which the downlink signal is received;

means for calculating an indication of power consumption associated with the indication of effective power radiatable to the network node for each of the plurality of selectively-activatable antenna panels; and means for selecting and configuring at least one of the selectively-activatable antenna panels to be used for transmission of a signal to a network node from which the downlink signal is received in response to the calculated indication of power consumption.

The apparatus may be such that the means for selecting and configuring at least one of the plurality of selectively-activatable antenna panels to be used for transmission of a signal is operable to select a transmission-capable antenna panel associated with the calculated indication of power consumption indicative of the lowest power consumption.

The apparatus may be such that the means for selecting and configuring at least one of the plurality of selectively-activatable antenna panels to be used for transmission of a signal is operable to select a transmission-capable antenna panel associated with the calculated indication of power consumption indicative of the lowest power consumption, subject to the determined indication of effective power radiatable by that antenna panel being above a preselected threshold.

The apparatus may be such that the means for selecting and configuring at least one of the plurality of selectively-activatable antenna panels to be used for transmission of a signal is operable to select an antenna panel which may differ from a selectively-activatable antenna panel selected for reception of the at least one downlink signal.

The apparatus may be such that the means for calculating an indication of power consumption associated with the indication of effective power radiatable to the network node for each of the plurality of selectively-activatable antenna panels is configured to determine, from a stored correlation for an antenna panel, an indication of power consumption associated with the determined indication of effective power radiatable to the network node for that antenna panel.

The apparatus may be such that the stored correlation comprises an indication of power consumption according to antenna panel, antenna beam configuration and/or beam steering angle.

The apparatus may be such that the apparatus comprises: means for selecting at least one of the plurality of the selectively-activatable antenna panels to be used for reception of a communication signal in dependence upon the obtained signal reception information related to at least one downlink signal received by the user equipment.

The apparatus may be such that selecting the reception antenna panel comprises selecting whether each of the selectively-activatable panels to be one of active and inactive in response to whether the signal reception information related to at least one downlink signal received by a user equipment has passed a predetermined threshold.

The apparatus may be such that the threshold comprises a threshold relating to received signal strength at each selectively-activatable reception antenna panel.

The apparatus may be such that selecting the reception panel on which to receive the communication signal comprises: selecting the selectively-activatable antenna panel which is determined to have the best received signal strength.

The apparatus may be such that received signal strength is determined in dependence upon one or more of: reference signal received power, signal to noise ratio and/or signal to interference and noise ratio.

The apparatus may be such that the signal reception information may be obtained from at least one of: a sensor on the user equipment; radio measurement of the at least one downlink signal received by the user equipment using the at least one reception antenna panel; and information from a network node providing the at least one downlink signal.

The apparatus may be such that the signal reception information comprises an indication of signal quality of the at least one downlink signal received by the user equipment using the at least one reception antenna panel and optionally wherein the indication of signal quality comprises at least one of: a reference signal received power, a reference signal received quality; signal to noise ratio and/or signal to interference and noise ratio.

The apparatus may be such that the indication of signal quality comprises at least one of: a reference signal received power, a reference signal received quality; and a signal-to-interference ratio.

The apparatus may be such that the means comprise: at least one processor; and at least one memory including computer program code, the at least one memory and computer program code being configured to, with the at least one processor, cause the performance of the apparatus.

According to various, but not necessarily all, embodiments of the invention there is provided a method, comprising: obtaining signal reception information related to at least one downlink signal received by a user equipment using at least one reception antenna panel of a plurality of selectively-activatable antenna panels;

determining an indication of effective power radiatable to the network node from which the downlink signal is received, based on the signal reception information related to the at least one downlink signal received by that antenna panel, for each of the plurality of selectively-activatable antenna panels which is configurable to transmit a signal to a network node from which the downlink signal is received, an indication of effective power radiatable to the network node from which the downlink signal is received, based on the signal reception information related to the at least one downlink signal received by that antenna panel;

calculating an indication of power consumption associated with the indication of effective power radiatable to the network node for each of the plurality of selectively-activatable antenna panels; and selecting and configuring at least one of the selectively-activatable antenna panels to be used for transmission of a signal to a network node from which the downlink signal is received in response to the calculated indication of power consumption.

The method may be such that the means for selecting and configuring at least one of the plurality of selectively-activatable antenna panels to be used for transmission of a signal is operable to select a transmission-capable antenna panel associated with the calculated indication of power consumption indicative of the lowest power consumption.

The method may be such that the means for selecting and configuring at least one of the plurality of selectively-activatable antenna panels to be used for transmission of a signal is operable to select a transmission-capable antenna panel associated with the calculated indication of power consumption indicative of the lowest power consumption, subject to the determined indication of effective power radiatable by that antenna panel being above a preselected threshold.

The method may be such that the means for selecting and configuring at least one of the plurality of selectively-activatable antenna panels to be used for transmission of a signal is operable to select an antenna panel which may differ from a selectively-activatable antenna panel selected for reception of the at least one downlink signal.

The method may be such that the means for calculating an indication of power consumption associated with the indication of effective power radiatable to the network node for each of the plurality of selectively-activatable antenna panels is configured to determine, from a stored correlation for an antenna panel, an indication of power consumption associated with the determined indication of effective power radiatable to the network node for that antenna panel.

The method may be such that the stored correlation comprises an indication of power consumption according to antenna panel, antenna beam configuration and/or beam steering angle.

The method may be such that the apparatus comprises: means for selecting at least one of the plurality of the selectively-activatable antenna panels to be used for reception of a communication signal in dependence upon the obtained signal reception information related to at least one downlink signal received by the user equipment.

The method may be such that selecting the reception antenna panel comprises selecting whether each of the selectively-activatable panels to be one of active and inactive in response to whether the signal reception information related to at least one downlink signal received by a user equipment has passed a predetermined threshold.

The method may be such that the threshold comprises a threshold relating to received signal strength at each selectively-activatable reception antenna panel.

The method may be such that selecting the reception panel on which to receive the communication signal comprises: selecting the selectively-activatable antenna panel which is determined to have the best received signal strength.

The method may be such that received signal strength is determined in dependence upon one or more of: reference signal received power, signal to noise ratio and/or signal to interference and noise ratio.

The method may be such that the signal reception information may be obtained from at least one of: a sensor on the user equipment; radio measurement of the at least one downlink signal received by the user equipment using the at least one reception antenna panel; and information from a network node providing the at least one downlink signal.

The method may be such that the signal reception information comprises an indication of signal quality of the at least one downlink signal received by the user equipment using the at least one reception antenna panel and optionally wherein the indication of signal quality comprises at least one of: a reference signal received power, a reference signal received quality; signal to noise ratio and/or signal to interference and noise ratio.

The method may be such that the indication of signal quality comprises at least one of: a reference signal received power, a reference signal received quality; and a signal-to-interference ratio.

The method may be such that the means comprise: at least one processor; and at least one memory including computer program code, the at least one memory and computer program code being configured to, with the at least one processor, cause the performance of the apparatus.

According to various, but not necessarily all, embodiments of the invention there is provided a computer program product operable, when executed on a computer, to perform a method as described above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function. Where an apparatus feature is described as means for performing a function, it will be appreciated that such means may comprise appropriate circuitry, and/or appropriate logic configured to perform that function.

BRIEF DESCRIPTION

Some example embodiments will now be described with reference to the accompanying drawings in which.

DETAILED DESCRIPTION

Before discussing the example embodiments in any more detail, first an overview will be provided.

Multi-panel user equipment (MPUE) for operation, for example, within a Frequency Range 2 (FR2) communication network are known. A limiting factor in relation to any user equipment is that of limited available power. Provision of multiple antenna panels can increase a need to provide user equipment in which power consumption is carefully considered. Connected-mode power consumption in FR2 deployments is a possible area in which power saving operation of MPUE may be particularly useful.

Multi-panel user equipment (MPUE) may be configured to operate in various ways. In particular, MPUE may differ in their capabilities regarding simultaneous transmission or reception. For example, a MPUE may be such that multiple panels are implemented on a UE and only one panel can be activated at a time, with panel switching/activation delay of few ms. Alternatively, a MPUE may be such that multiple panels are implemented on a UE and multiple panels can be activated at a time and one or more panels can be used for transmission. Alternatively, a MPUE may be such that multiple panels are implemented on a UE and multiple panels can be activated at a time but only one panel can be used for transmission. It will therefore be appreciated that a MPUE is not necessarily able to receive from multiple panels simultaneously, and/or a MPUE is not necessarily able to transmit from multiple panels simultaneously. As a result, MPUE to are such that they are able to implement one or more decision mechanism to choose a receive and/or transmit panel(s) from the available antenna panels. Such decisions can be UE implementation specific. Baseline UE behavior is to choose a panel for use according to a best received downlink reference signal received power (RSRP) value of a connected beam.

Figure 1:
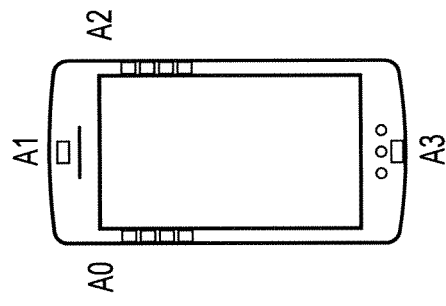
FIG. 1 illustrates schematically two types of Multi Panel User Equipment (MPUE)

MPUE may be provided in a range of forms. In particular, there may be no set antenna panel configuration or antenna panel type. FIG. 1 illustrates schematically two types of Multi Panel User Equipment (MPUE). Each MPUE has four antenna panels: A0, A1, A2, A3. High-tier MPUEs are likely to be equipped with multiple high gain panels, each covering a specific area of a coverage sphere, as shown schematically on the left hand side of FIG. 1. Such high gain panel solutions are expensive. Mid-tier and low-tier MPUEs might only be equipped with only one or two high-gain panels A0, A2 as shown in the example of the right hand side of FIG. 1, and may be equipped with one or more cheaper antenna patch alternatives A1, A3, arranged at the UE in a manner to provide coverage sufficient to comply with standard requirements. A cheap and effective solution is to add several single-element-panels A1, A3 around the UE to increase the coverage and link robustness. Single-element-panels are attractive since their implementation losses are less than that of a 1×4 antenna array as a result of their less complex implementation, for example, not requiring phase shifters and an element distribution network.

Whether high or low end, a MPUE is such that for each type of antenna panel A0, A1, A2, A3 provided the front end radio architecture is optimised for operation of that particular panel type. When panels exhibit different capabilities, they may also require differences in receive (Rx) and transmit (Tx) chains to support optimum performance. Particularly, power amplifier (PA) optimization may be panel-specific such that, for example, a UE can transmit at 23 dBm with this panel and therefore meet Power Class 3 (PC3) UE requirements. For example, if an antenna panel only contains a single element, the PA may be optimized at 23 dBm. Similarly, if an antenna panel contains 4 elements, the PA may be optimized such that the combined PA power from all 4 ports reaches 23 dBm and such that the Effective isotropic radiated power (EIRP) is above 22.4 dBm, in order for the UE to be classified as a PC3 device.

Figure 2B:
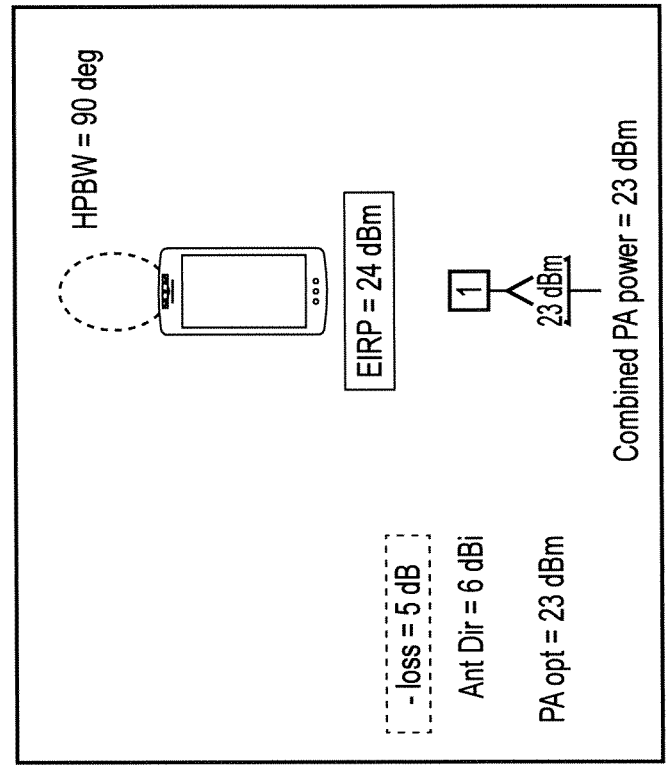
FIG. 2A and FIG. 2B illustrate schematically features of two possible radio frequency front end antenna panel architectures.
Figure 2A:
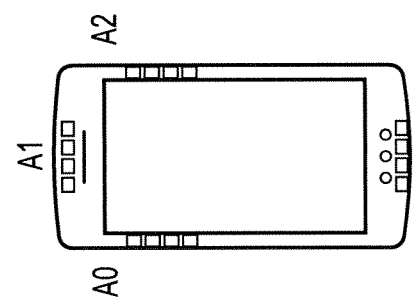
Figure 2A:
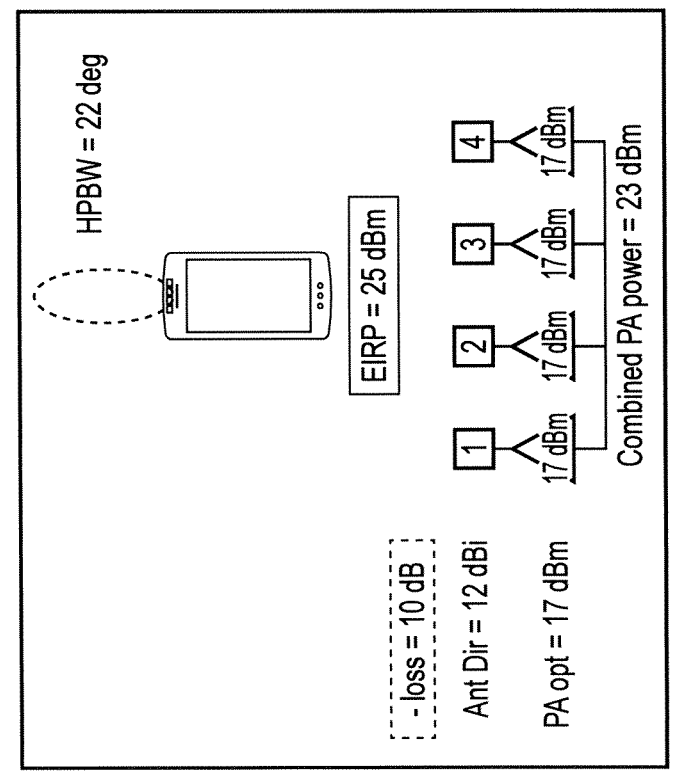

FIG. 2A and FIG. 2B illustrate schematically features of two possible radio frequency front end antenna panel architectures. FIG. 2A relates to a 4×1 antenna panel architecture and FIG. 2B relates to a single patch panel architecture. In FIG. 2A, the 4×1 antenna panel can produce a beam having a half power beam width (HPBW) of 22 degrees to have an effective isotropic received power (EIRP) of 25 dBm. The panel is formed from 4 antenna elements, each with an associated power amplifier. According to "optimal" PA operation, each PA operates at 17 dBM to support a combined PA power of 23 dBm to achieve the EIRP of 25 dBm. By contrast, the single element arrangement of FIG. 2B can produce a beam having a half power beam width (HPBW) of 90 degrees to have an effective isotropic received power (EIRP) of 24 dBm. A single power amplifier is required. According to "optimal" PA operation, the PA operates at 23 dBm to achieve the EIRP of 24 dBm. It will be appreciated, when considering possible patch architectures, that power amplifier efficiency is not flat or linear over available output power and therefore that differing power amplifier optimisation choices have a particular impact upon battery drain of user equipment in a manner which depends upon output power in a panel-specific way.

Furthermore, in addition to a power amplifier implementation which is optimized per panel design, the antenna element type and the RF chain can be optimized per panel design. For example, for the single-element panel shown in FIG. 2B, there is no need for a phase shifter and the antenna element itself could be any one of: a patch antenna, monopole or dipole. The latter two options can maximize radiated efficiency due to much lower antenna Q. Therefore, total insertion loss in a single-element panel transmitter such as that shown in FIG. 2B can be significantly smaller than the loss of the 1×4 phased array transmitter shown in FIG. 2A.

The loss differences between antenna patch arrangements may be significant. There is, for example, an insertion loss of 10 dB for the phased array shown in FIG. 2A and a 5 dB insertion loss in relation to the single-element panel shown in FIG. 2B.

Figure 3:
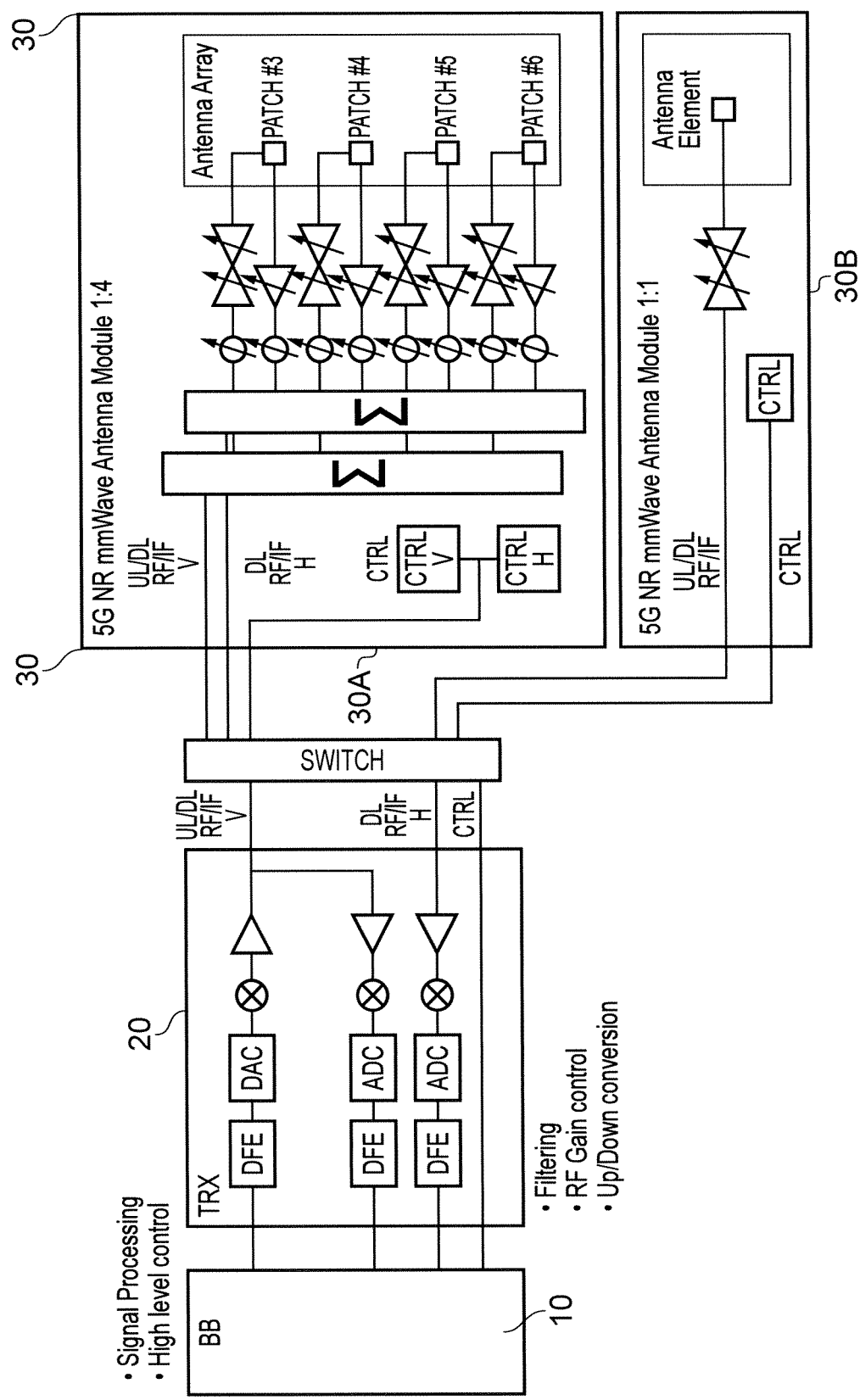
FIG. 3 illustrates schematically user equipment radio frequency front end component architecture for a MPUE having two antenna panels.

FIG. 3 illustrates schematically user equipment radio frequency front end component architecture for a MPUE having two antenna panels. The architecture comprises a shared baseband unit 10, a shared transceiver section 20 connectable to one or both of the antenna panels 30A, 30B, which together form the antenna portion 30. The antenna portion 30 in the example shown consists of a 1×4 antenna panel 30A and a single element panel 30B.

UE power control and efficiency is subject to various standards and thresholds. An overarching approach is that UEs must be able to generate a signal with high enough power to communicate with a network, but also not such high power as to cause potential harm if close to a user for a sustained period of time. In addition to the overarching approach to use of power, the provision of UE with a battery which has limited available energy results in various power control and power saving approaches. Nonetheless, MPUE include additional functionality which can facilitate different approaches to UE power management.

Accordingly, some arrangements may provide an apparatus, comprising: means for obtaining signal reception information related to at least one downlink signal received by a user equipment using at least one reception antenna panel of a plurality of selectively-activatable antenna panels; means for determining an indication of effective power radiatable to the network node from which the downlink signal is received, based on the signal reception information related to the at least one downlink signal received by that antenna panel for each of the plurality of selectively-activatable antenna panels which is configurable to transmit a signal to a network node from which the downlink signal is received, an indication of effective power radiatable to the network node from which the downlink signal is received, based on the signal reception information related to the at least one downlink signal received by that antenna panel; means for calculating an indication of power consumption associated with the indication of effective power radiatable to the network node for each of the plurality of selectively-activatable antenna panels; and means for selecting and configuring at least one of the selectively-activatable antenna panels to be used for transmission of a signal to a network node from which the downlink signal is received in response to the calculated indication of power consumption.

An issue in relation to operation of any UE is how to minimize UE power consumption, thereby maximising UE battery life. Power consumption at UE is mainly driven by UE transmit operation whilst in an RRC_Connected mode. Typically, consumption of power for a single panel is split across the Front-End (FE), the baseband (BB) and the transceiver (TRX) for a given transmit power level. The transceiver and base band are both significant consumers of power.

MPUE facilitate operation in which it is possible to use differing antenna panels, if appropriate, to perform reception and transmission to best support communication within a network. This is in contrast to what might be considered standard operation of UE within a communication network, where it is conventional that the UE reception beam management is driven by downlink RSRP, SNR and/or SINR maximization and a typical UE behaviour implements joint UE Tx/Rx beams, ie uses the same antenna panel for transmission as has been selected for reception.

In particular, appropriate power efficient operation of MPUE may allow for differentiated uplink and downlink panel selection, which can enable UE power saving, whilst minimising performance loss, or incurring no significant performance loss. In other words, a MPUE may be configured to differentiate an antenna panel to be used for transmission from an antenna panel to be used for reception. The reception panel(s) may be selected based upon which panel(s) are receiving a signal with best signal quality. Irrespective of quality of signal received at a panel, a determination can be made of whether a transmit panel is able to communicate with a network effectively and a power expenditure associated with that effective communication. Selection of an antenna panel for making transmissions to the communication network may therefore be based upon the power expenditure associated with maintaining effective communication with the network using that panel. Provided an antenna panel is capable of effective transmission within the network, the received signal quality at the panel may be of little relevance to selection of a panel for transmission. The provision of multiple antenna panels on a UE may mean that it becomes possible to use a single-element antenna panel for transmission in order to save PA power consumption and maintain good UL performance, whilst using a multi-element antenna panel for reception. Using a single element of that same multi-element panel for transmission is unlikely to offer the same power savings as use of a single element panel, given the selection of other RF FE components to optimise, for example, operation of the entire array of elements.

Figure 4:
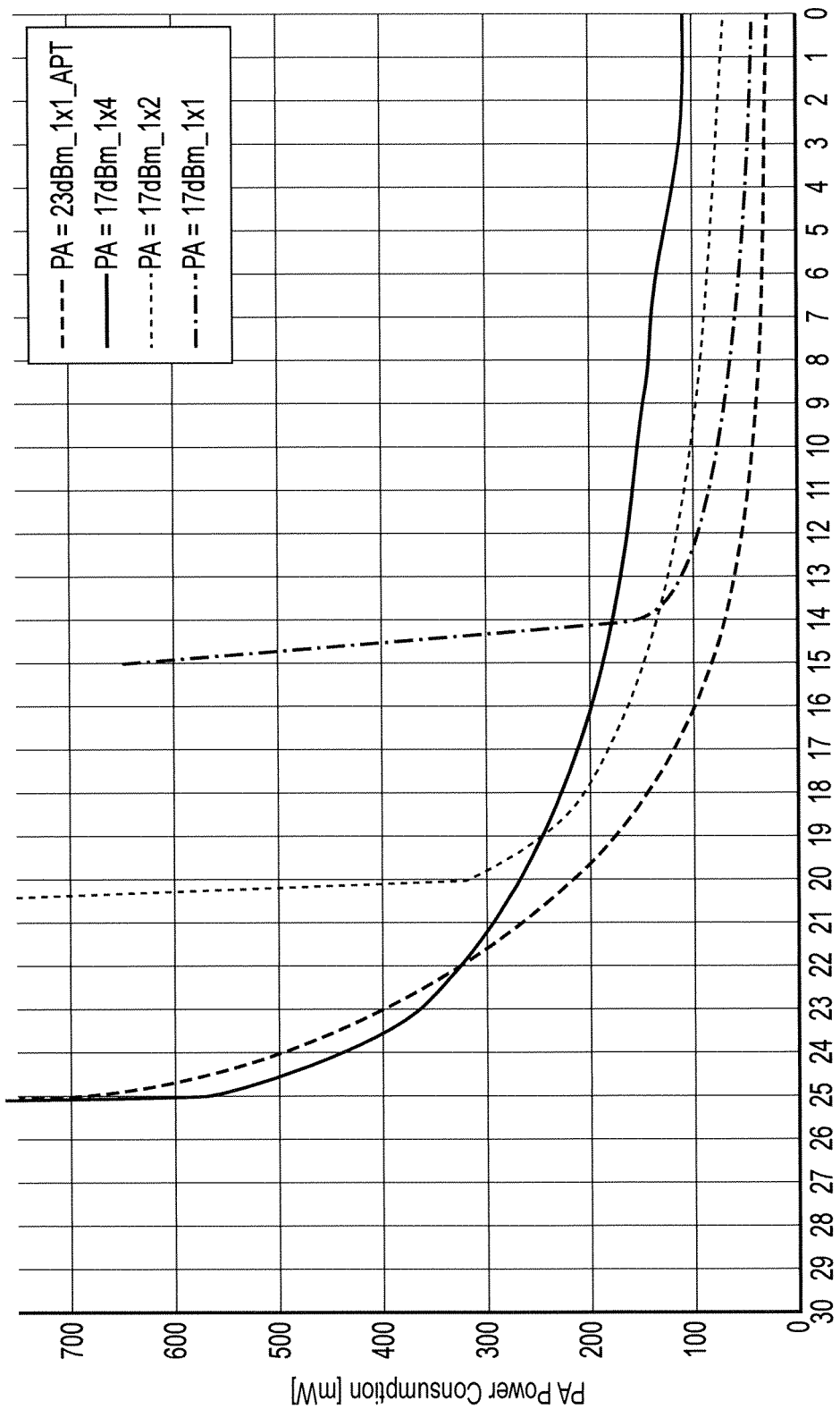
FIG. 4 shows the relationship between Power Amplifier (PA) power consumption for a given Effective Isotropic Received Power (EIRP) for boresight beam configuration in relation to different antenna panel array configurations of a 1×4 array using different number of elements and a standalone single element antenna.

FIG. 4 shows the relationship between Power Amplifier (PA) power consumption for a given Effective Isotropic Received Power (EIRP) for boresight beam configuration in relation to different antenna panel array configurations of a 1×4 array. The configurations shown are full 1×4 operation (solid line); 1×2 operation (dotted line); and 1×1 operation (dash-dot line). Also shown, for comparison purposes, is an equivalent relationship for a single element antenna (dashed line). Provision of a multi-element antenna panel does offer up beam scaling as a mechanism for achieving power scaling. Such beam scaling and power usage associated with beam scaling has been computed and is shown in FIG. 4 with the following assumptions: average power Tracking (APT) only for single PA design; an assumption on PA quiescent power 15 mW and agreed levels of antenna loss.

With reference to FIG. 4, it can be seen that downscaling an array from 4 active elements to a single active element can provide a significant reduction in PA power consumption. Moreover, FIG. 4 also shows the reference PA power consumption of a single-element antenna (dashed curve). The power consumption of a single-element panel (due to the lower insertion loss) can be significantly lower than that of a multi-element patch array, even with only one patch element active on the array, particularly at low EIRP. Indeed, at low EIRP (e.g. below 17 dBm for a 1×4 array with 10 dB loss) the quiescent current is per PA and dominates the PA power consumption. FIG. 4 shows that even when only operating a single element of a 1×4 array, the associated power consumption is still higher than a single element design for the same EIRP. Nonetheless, it can also be seen that where a multi-element panel is provided, or in the case where several multi-element panels are provided at different locations on a UE, it may be possible to use beam scaling, and selective use of some of the elements in the array, to try and achieve power savings.

The apparatus may comprise user equipment, or a similar network connectable device.

The apparatus may comprise: means for obtaining signal reception information related to at least one downlink signal received by a user equipment using at least one reception antenna panel of a plurality of selectively-activatable antenna panels. The selectively-activatable antenna panels may comprise antenna panels of at least two types. One of the antenna panel types may comprise a single element panel. One of the antenna panel types may comprise an antenna array.

The apparatus may comprise: means for determining an indication of effective power radiatable to the network node from which the downlink signal is received, based on the signal reception information related to the at least one downlink signal received by that antenna panel for each of the plurality of selectively-activatable antenna panels which is configurable to transmit a signal to a network node from which the downlink signal is received. One, some, or all of, the antenna panels may be configured as a transceiver, operable or configurable to transmit and receive a signal from the apparatus. The apparatus may comprise means for calculating an indication of power consumption associated with the indication of effective power radiatable to the network node for each of the plurality of selectively-activatable antenna panels. The apparatus may comprise means for selecting and configuring at least one of the selectively-activatable antenna panels to be used for transmission of a signal to a network node from which the downlink signal is received in response to the calculated indication of power consumption.

Regarding appropriate selection of a transmission antenna panel, various arrangements are possible. According to one arrangement, for example, the means for selecting and configuring at least one of the plurality of selectively-activatable antenna panels to be used for transmission of a signal is operable to select a transmission-capable antenna panel associated with the calculated indication of power consumption indicative of the lowest power consumption. Accordingly, consumption of power at, for example, a network connectable device having a limited power supply, can be strongly optimised to be as small as may be achievable whilst also seeking to retain reception and transmission functionality by such a device.

According to some arrangements, retention of functionality may be considered by, for example, implementation such that the apparatus has means for selecting and configuring at least one of the plurality of selectively-activatable antenna panels to be used for transmission of a signal which is configured or operable to select a transmission-capable antenna panel associated with the calculated indication of power consumption indicative of the lowest power consumption, subject to the determined indication of effective power radiatable by that antenna panel being above a preselected threshold.

The threshold may be selected may be such that effective communication with another network node, such as a gNB, is supportable.

Arrangements may be such that the means for selecting and configuring at least one of the plurality of selectively-activatable antenna panels to be used for transmission of a signal is operable to select an antenna panel which may differ from a selectively-activatable antenna panel selected for reception of the at least one downlink signal. Accordingly transmission and reception at the apparatus may be split across more than one antenna panel. In other words, apparatus may be such that more than one antenna panel is activated. One antenna panel may be activated for transmission. A different antenna panel may be activated for signal reception. The antenna panel activated for each of transmission and reception may be an antenna panel of a different type. In other words, the panel activated for transmission may be a single element panel or an array, and the panel activated for reception may be the other of a single element panel or an array.

Regarding appropriate calculation of power consumption of a transmission antenna panel, various arrangements are possible. For example, the means for calculating an indication of power consumption associated with the indication of effective power radiatable to the network node for each of the plurality of selectively-activatable antenna panels may be configured to determine an indication of power consumption associated with the determined indication of effective power radiatable to the network node for that antenna panel from a stored correlation for an antenna panel. The stored correlation may comprise an appropriate look up table or graph. The stored correlation may relate to a particular antenna panel type, or particular implementation of an antenna panel type. The stored correlation comprises an indication of power consumption according to antenna panel, antenna beam configuration and/or beam steering angle.

Regarding selection of a panel for downlink, various arrangements are possible. According to some arrangements, the apparatus may comprise: means for selecting at least one of the plurality of the selectively-activatable antenna panels to be used for reception of a communication signal in dependence upon the obtained signal reception information related to at least one downlink signal received by the user equipment. Accordingly, apparatus may be configured to select an antenna panel for reception of a signal according to the antenna panel which is best receiving or capable of best receiving that signal.

In some arrangements selection of a reception antenna panel comprises: selecting whether each of the selectively-activatable panels to be one of active and inactive in response to whether the signal reception information related to at least one downlink signal received by a user equipment has passed a predetermined threshold. There may, for example, be a choice of available activatable panels suited to reception of a signal.

There may be a minimum threshold of signal quality which a panel may need to achieve before it becomes a candidate for reception of the signal. If one or more panels is capable of receiving at a required threshold or above, a selection of panel may be made within those panels which meet the threshold.

In some arrangements, the threshold comprises a threshold relating to received signal strength at each selectively-activatable reception antenna panel. The received signal strength may be determined in dependence upon one or more of: reference signal received power, signal to noise ratio and/or signal to interference and noise ratio, all of which may offer an indication of how well an antenna panel may receive a signal.

In some arrangements, selecting the reception panel on which to receive the communication signal comprises: selecting the selectively-activatable antenna panel which is determined to have the best received signal strength. If more than one antenna panel may receive at a similar signal strength, a determination of which antenna panel to use for reception may be made in dependence upon a secondary factor, such as power usage for reception of those panels.

Regarding determination of signal reception information, various arrangements are possible. In some arrangements, the signal reception information may be obtained from at least one of: a sensor on the user equipment; radio measurement of the at least one downlink signal received by the user equipment using the at least one reception antenna panel; and information from a network node providing the at least one downlink signal. In particular, as described herein, it will be appreciated that the signal reception information comprises an indication of signal quality of the at least one downlink signal received by the user equipment using the at least one reception antenna panel and optionally wherein the indication of signal quality comprises at least one of: a reference signal received power, a reference signal received quality; signal to noise ratio and/or signal to interference and noise ratio.

Arrangements may be such that the apparatus includes a computer, a chip or software which is configured to perform the various steps set out above. In other words, the "means" referred to may comprise: at least one processor; and at least one memory including computer program code, the at least one memory and computer program code being configured to, with the at least one processor, cause the performance of the apparatus.

Example Operation

Figure 5A:
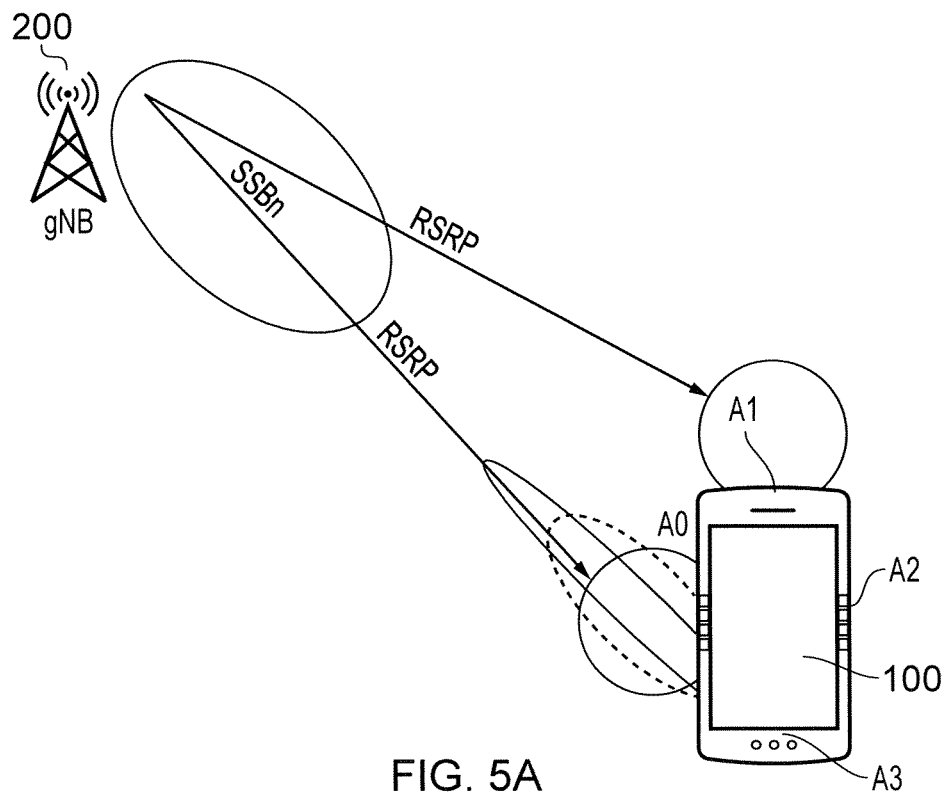
FIG. 5A and FIG. 5B illustrate schematically one possible example of an MPUE arrangement in which differentiated uplink and downlink panel selection is implemented.
Figure 5B:
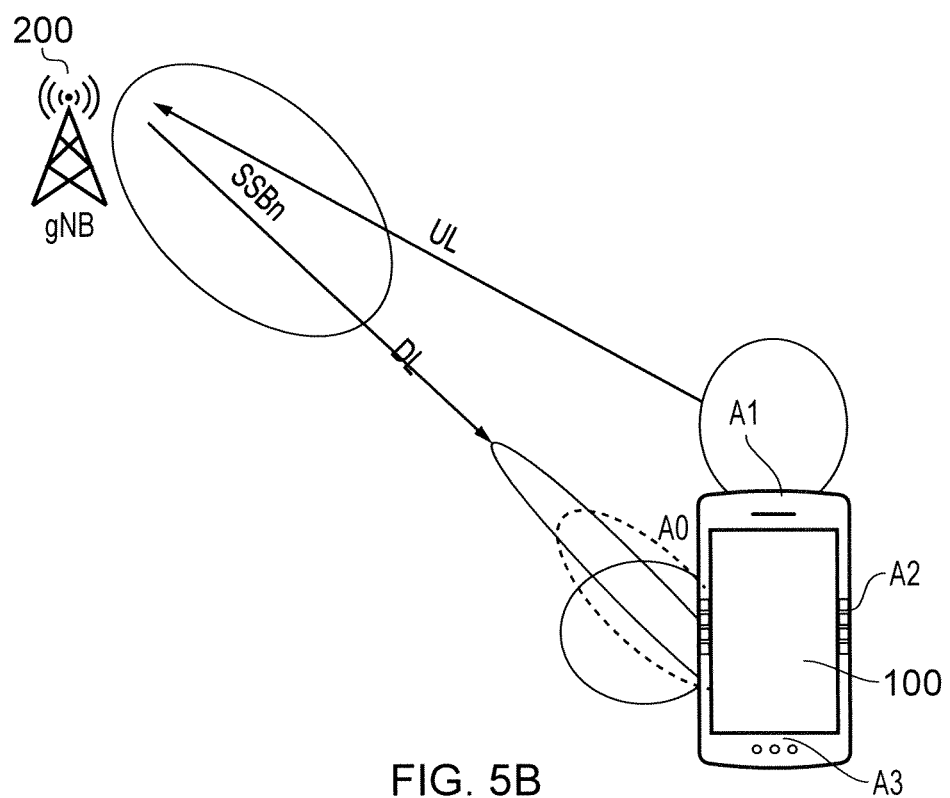

FIG. 5A and FIG. 5B illustrate schematically one possible example of an MPUE arrangement in which differentiated uplink and downlink panel selection is implemented, facilitating UE power saving with no performance loss, in it is determined that there is power to save. In other words, the UE is configured to differentiate TX panel operation and RX panel operation to save, for example, PA power consumption.

FIG. 5A and FIG. 5B show an MPUE 100 which has four antenna panels A0, A1, A2, A3. Two panels are single element panels A1, A3. Two panels are multi-element array panels A0, A2. A0 and A2 are 1×4 antenna arrays, and A1 and A3 are a single-element antenna. In the illustrated arrangement both A0 and A1 receive a signal from a serving base station 200 with similar RSRP level during beam scan mode meaning that they are equal contenders for selection in relation to reception mode of a signal from the base station 200. However, the PA power consumption calculated in relation to operation of A1 may be significantly lower than that of operating A0 for the same EIRP, even if A0 is only activating a single element, due to the lower implementation loss of a single-element design versus the design trade-offs of a phased array, as shown in quantitative terms in the correlation curves of FIG. 4.

In order to optimize power consumption, an MPUE according to an arrangement is configured to run separate panel management processes for UL and for DL communication. The DL panel management process aims to maximizing RSRP, SNR and/or SINR. The UL panel management process aims to minimise UE power consumption, particularly in relation to PA operation, while maintaining target EIRP. According to some implementations, for example, in cases where an estimated power consumption for an active phased-array panel (such as A0 and A2 in FIGS. 5A and 5B) is determined to be lower than the estimated power consumption in relation to similar operation of other panels, the UE may be configured to use the same RX and TX beams (i.e. same panel and same codebook entry). However, in cases where an estimated power consumption is calculated to be less if transmissions are made using a different panel, a UE according to some arrangements may be such that different RX and TX panels can be selected and configured for use. In other words, arrangements may enable use of a TX beam supported by an antenna panel other than that selected for use as a downlink RX panel. That selection of disparate antenna panels may support minimised or improved overall UE power consumption.

In the scenario presented in FIG. 5B, the UE 100 implements an antenna panel selection process and the outcome of that process is a decision to use antenna panel A1 for TX and A0 for RX. That selection minimises PA power consumption without any impact on UL, since both panel A1 and A0 have been determined to be able to deliver the same power in the direction of the gNB 200. The UE splits TX and RX between antenna panels and chooses for the TX panel an apparently sub-optimal panel (from a DL RSRP perspective only) to save power without any loss of link quality.

Figure 6:
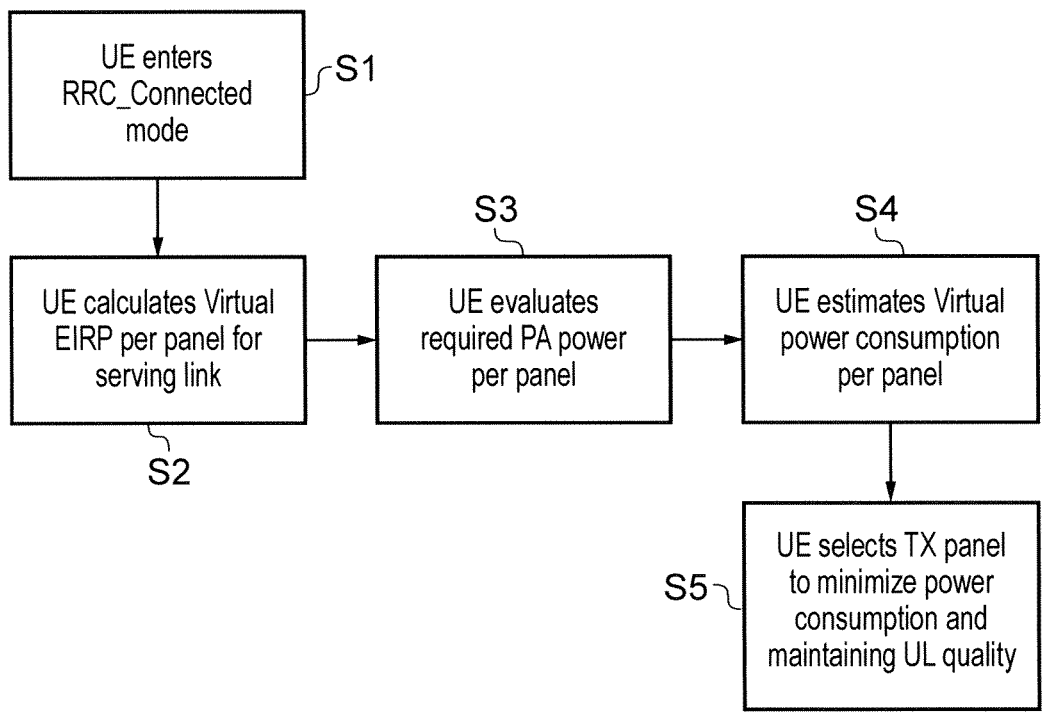
FIG. 6 illustrates some main steps of an antenna panel selection process implementable by a multi-panel UE in a communication network in relation to transmission of a communication signal.

FIG. 6 illustrates some main steps of an antenna panel selection process implementable by a multi-panel UE in a communication network in relation to transmission of a communication signal. The details of the high-level flow illustrated in FIG. 6 are described below:

S1: The UE enters RRC connected mode.

S2: The UE calculates the EIRP needed per panel for the current serving link, which is named the "Virtual" EIRP. The calculation of Virtual EIRP is based on: maximum gain per panel and required PA power needed to compensate for any difference in power levels received across panels in relation to the serving link (i.e. RSRP per panel for the serving link).

S3: The UE evaluates absolute PA power required for Virtual EIRP given available gain on alternative panel in order to maintain UL quality.

S4: The UE estimates "Virtual" power consumption to meet a specific calculated virtual EIRP per panel. Such an estimation may, for example, be implemented using using a lookup table or stored correlation values such as those shown in FIG. 4 in relation to a possible beam configuration and steering angle.

S5: The UE selects the UL panel in dependence upon the estimated PA power consumption while meeting the UL power control requirements. The selection is done to optimise minimal UE power consumption.

The steps S1 to S5 are described in more detail in relation to one possible implementation below.

It will be appreciated that implementation of selection of an antenna panel for transmission from a MPUE to a base station or other network node in accordance with a selection process shown in FIG. 6 is such that operation of a TX UE panel may be managed separately from operation of a RX UE panel. UE TX panel management is driven by a power consumption perspective, not solely on the basis of downlink reference signal received power (RSRP) link budget. According to some management processes, a MPUE may be configured to store PA power consumption values for different EIRP levels on a per panel, per beam configuration, and/or per steering angle basis. According to some management processes, the UE may be configured to compare virtual EIRP per panel calculated or determined based on RSRP per panel. According to some management processes, the UE may be configured to calculate a PA operational requirement to meet a virtual EIRP. The UE may be configured to estimate PA power consumption associated with the calculated PA operational requirement on a per panel basis. According to some management processes, the UE may be configurable to use different panels for RX and TX where it is determined that such a split of antenna panel use can minimize power consumption while maintaining UL quality within a similar RSRP threshold across panels.

The detail of the main steps S1 to S5 set out above may, in some arrangements, comprise some or all of the following steps:

S1: The MPUE enters RRC connected mode. The methods described herein have applicability to operation of a UE in a connected mode, since transmission in a connected mode represents significant power usage at a UE.

S2. The MPUE is configured to calculate an EIRP needed to achieve successful UL communication with a base station (eg 200 in FIG. 5A and FIG. 5B) from the available panels. That calculation occurs in relation to those panels of all available antenna panels for which the MPUE can detect serving gNB signals at a RSRP above a threshold.

The calculated EIRP per panel is termed a "Virtual EIRP" since only one of the panels would be used for UL transmission, and the calculation is only a virtual EIRP until one of the panels is selected for UL operation.

The person skilled in the art will be aware of various UL power control mechanisms, for example P_PUSCH or PUCCH and the mechanism by which a (virtual) EIRP can then be calculated. Whilst described in relation to PUSCH, it will be appreciated that antenna panel management may be performed in relation to various channels or combinations of channels, for example: PRACH, PUCCH, PUSCH and SRS or a subset of channels, for example, PUSCH only.

The Virtual EIRP (VEIRP) is defined for PUSCH as follows:

$$\text{VEIRP}=\text{Maximum Panel Array Gain}+P\_PUSCH \quad (1)$$

VEIRP is calculated using maximum panel gain, and therefore for any incoming angle other than boresight, array gain will vary. By way of example, the maximum Panel Array Gain for a 4-patch element panel could be 12 dBi, whereas for a 1-patch element panel it could be 6 dBi.

In some implementations, a MPUE may be configured such that a dynamic threshold is embedded which speeds up or delays an UL panel switch based solely upon likely calculated power consumption for a boresight implementation, that switch between UL panels taking place according to UE local knowledge or determination of angle of arrival of a current UE beam, target (candidate) UE beam from a different antenna panel or both.

According to some implementations, it will be understood that a split of uplink and downlink operation at a UE may occur, for example, either by: selecting a DL/UL antenna panel based on DL RSRP, SNR and/or SINR maximization on UE broad beam and switch UL operation to another antenna panel in the event that such a switch optimizes power consumption; or selecting a DL/UL antenna panel based on DL RSRP, SNR and/or SINR on UE broad beam and switching only DL to another panel capable of refining the UE beam to enhance RX, keeping the UL operation at the original antenna panel.

S3. The MPUE may be configured to evaluate which of the antenna panels are able to meet the EIRP needed to maintain proper UL power control.

In one implementation, the MPUE may evaluate whether each panel is able to meet a threshold EIRP needed to maintain UL power control in relation to ongoing UE transmission to a base station. It will be appreciated that for panels with a single antenna element or for panels which have few antenna elements, available UL array gain will be lower than for the panels with larger number of elements (for example, 4 or 8). If a target (threshold) V-EIRP cannot be met for a given panel, this panel is discarded for next step.

S4. For those antenna panels that are determined to meet UL power control requirements, the UE may be configured to estimate Virtual Power Consumption (VPC).

A precalculated "Virtual power consumption" lookup table can be generated in production and commissioning of UE antenna panels. Such a generated table may be generated in relation to an ideal UE device with such theoretical or empirically obtained values to be used in relation to all commissioned devices. Such a table stores values or correlations similar to those illustrated graphically in FIG. 4. Those values may be stored and adjustable in accordance with real load conditions (for example, steering angle). By way of example, as a UE operates and aligns a DL beam, the load conditions become known for a RX narrow beam setting, and the UE may be configured to refine its VEIRP in accordance with beam alignment and load an appropriate lookup table to gain improved accuracy in relation to estimated PA power consumption and associated possible power saving.

Figure 7:
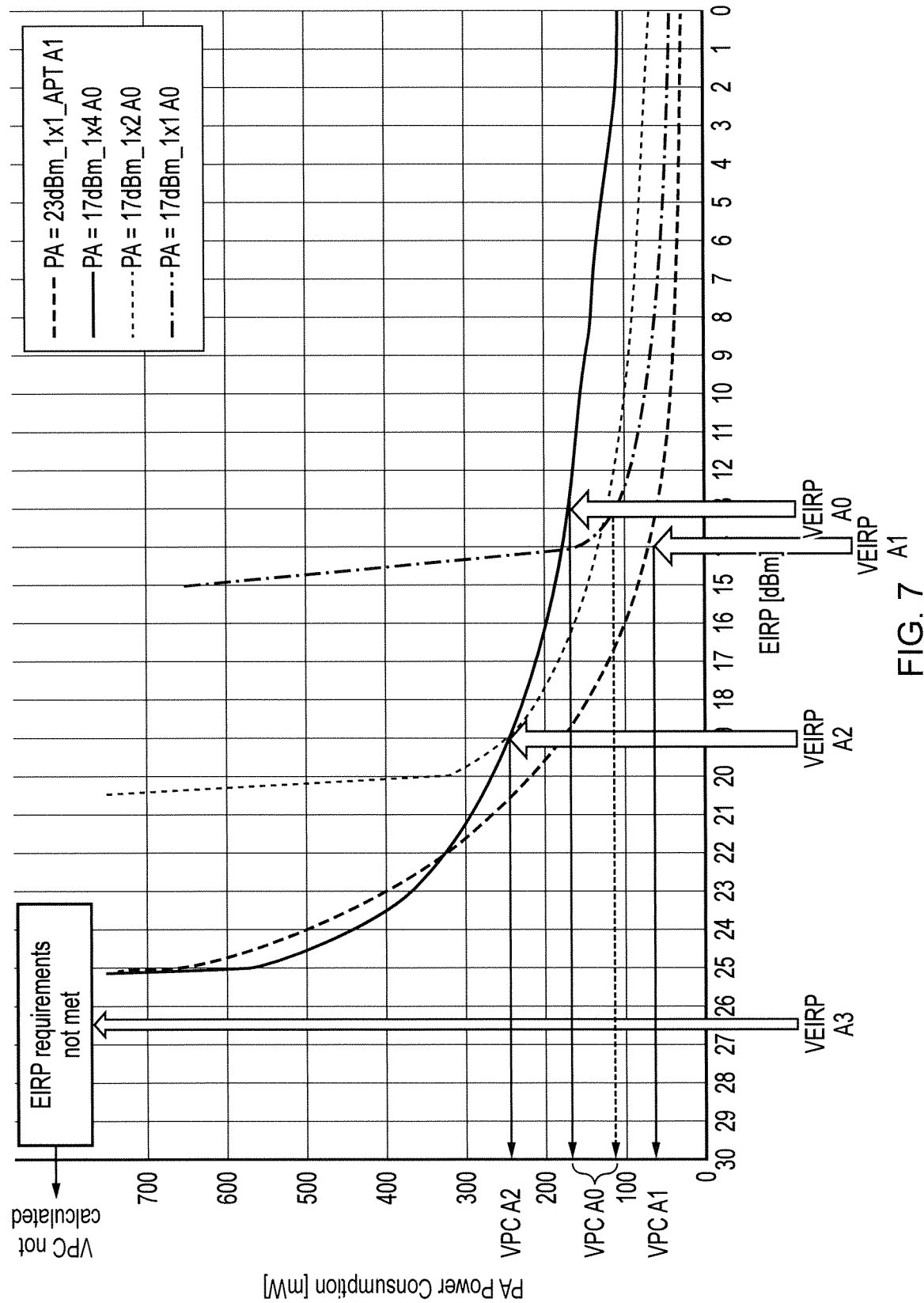
FIG. 7 is a graphical representation of correlation between EIRP and Power Consumption for a particular set of antenna panels in a MPUE.

FIG. 7 is a graphical representation of correlation between EIRP and Power Consumption for a particular set of antenna panels in a MPUE. As illustrated in FIG. 7 a MPUE may be configured to estimates a power consumption value corresponding to each calculated Virtual Target EIRP on antenna panels determined to meet EIRP requirements.

A0 and A2 being the 1×4 phased arrays and, A1 and A3 being the single-element panels.

By way of example, assume a MPUE arrangement such as that shown in FIGS. 5A and 5B, where MPUE 100 is in communication with base station 200 and is equipped with four antenna panels, A0 and A2 being 1×4 phased arrays and A1 and A3 being single-element panels. According to one possible panel management methodology, MPUE 100 may be configured to checks the following:

A0 is determined to have the best RSRP value and is the first chosen panel for power calculation purposes. A0 is determined to have the smallest EIRP (i.e. best RSRP value) and is associated with a virtual power consumption, according to the lookup graph shown in FIG. 7, VPC A0.

For power consumption reasons A0 could downscale to a single-patch operation. If it were to do so, a slightly lower VPC A0 would result, as shown in FIG. 7.

The MPUE may be configured to calculate VEIRP for antenna panel A1 and, once calculated, can look up an associated power consumption VPC A1. It can be seen that A1 exhibits the smallest VPC for the required VEIRP. As a result, the MPUE may be configured to switch UL operation to antenna panel A1 to optimize power consumption.

The MPUE may be configured to calculate VEIRP for antenna panel A2 and, once calculated, can look up an associated power consumption VPC A2. Antenna panel A2 is pointing away from the main direction of incoming power from the base station 200 to MPUE 100, so the required VEIRP associated with operation of panel A2 is higher due to small UE beam gain (for example, the antenna panel may effectively be using a generated back lobe).

The MPUE may be configured to calculate VEIRP for antenna panel A3. The VEIRP is "out of reach" and therefore a power consumption VPC A3 is not calculatable using the look up graph shown in FIG. 7. In other words, the VEIRP associated with use of antenna panel A3 would be higher than the 26 dBm upper threshold, which is the maximum EIRP capabilities for that UE.

Based on the actions described above, it will be appreciated that a MPUE may be configured to manage its operation so that it follows a process leading to the smallest VPC in relation to an UL antenna panel decision, independently of the DL antenna panel decision which can be solely based on RSRP optimization.

S5: The MPUE may be configured to select and configure for transmit operation, an UL antenna panel based upon a determination of which panel gives lowest power consumption while meeting uplink power control requirements. In the example of FIG. 7 and FIGS. 5A and 5B, the VPC A1 (single-element panel) is determined to have the lowest power consumption while meeting the VEIRP requirements.

To summarize: some arrangements of antenna panel management may be such that if a difference in EIRP between antenna panels is equal to, or less than, a difference in RSRP between antenna panels, then panel management may be such that UL panel management suggests operating UL on the lowest power consuming panel, which is likely to differ from the panel supporting downlink operation. DL operation remains on best RSRP panel, for example, including narrow beam gain for DL only.

Independent UL and DL management according to some arrangements may be such that behaviour of the UE can be adapted to radio conditions whilst taking into account power usage implications. A UE may, for example, use a single element antenna to transmit to a gNB if a UE is close to the gNB and directionality may be less important, thus making a power saving, and may for example, use a 1×4 array for transmission when far away from a gNB as a result of a directionality requirement. In some instances, it may be that for absolute EIRP levels typical of an MPUE which is far from a base station (gNB), independent UL panel management operates to force the MPUE to utilise single-element panels (such as A1 and A3 in FIG. 5A or 5B) to save power for as long as RSRP values permit it.

NUMERICAL EXAMPLE

To illustrate potential power saving which may be achieved as a result of implementation of panel management in accordance with some described arrangements, a numerical example is provided. Such an example shows potential gain in battery power in mW in relation to a UE using the proposed Tx/Rx beam management for a given EIRP level.

Take an example desired EIRP of 13 dBm in relation to the look up table of FIG. 7:

a. Typical operation with joint Tx/Rx antenna panel operation using a narrow beam from a multi element array: PA consumption 170 mW when using the full panel (1×4)
b. By downscaling Tx and Rx on the multi element panel to use fewer antenna elements: PA consumption falls to 110 mW with a Rx loss of 6 dB
c. By downscaling only Tx operation on the multi-element panel, the PA consumption falls to 110 mW and Rx unaffected
d. Management of panels in accordance with described arrangements would move Tx to a single element panel: PA consumption falls to 60 mW and Rx unaffected Hence using the numbers of a look up table similar to that of FIG. 7, at 13 dBm EIRP antenna panel management in accordance with described arrangements can provide a significant gain in PA power compared to typical UE Rx/Tx beam management (e.g. from 170 mW to 60 mW). Whilst it will be appreciated that the gains available are dependent upon on UE implementation (for example, available antenna panels and antenna panel configurations, PA design and similar) it is believed that panel management in accordance with described methods can represent significant power consumption gains.

Advantages of antenna panel management in accordance with some described arrangements include improved UE battery life.

Advantages of antenna panel management in accordance with some described arrangements in which a MPUE is configured to implement Tx beam management independently from Rx beam management an decouple a requirement to use a coincident antenna panel to support both allows for support of minimized UE power consumption; maximized DL performance, rather than compromising one or both in support of the other; maintenance of a good UL performance; the management performed at the MPUE is transparent from the viewpoint of the gNB since the UE operates to use the same SSB and it complies with radio resource management specifications governing operation of UE within a communication network, including an FR2 network.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry", "means" or "logic" may refer to one or more or all of the following:
(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry, logic and means applies to all uses of such terms in this application, including in any claims. As a further example, as used in this application, the terms circuitry, logic and/or means also covers an implementation of merely a hardware circuit or processor (or multiple processors) or portion of a hardware circuit or processor and its (or their) accompanying software and/or firmware. The terms circuitry, logic and means also cover, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   at least one processor; and
   at least one memory storing instructions that, when executed by the at least one processor, cause the apparatus at least to perform:
   obtaining signal reception information related to at least one downlink signal received by a user equipment using at least one reception antenna panel of a plurality of selectively-activatable antenna panels;
   determining an indication of effective power radiatable to a network node from which the at least one downlink signal is received, based on the signal reception information related to the at least one downlink signal received by that antenna panel for each of the plurality of selectively-activatable antenna panels which is configurable to transmit a signal to the network node from which the at least one downlink signal is received;
   calculating an indication of power consumption associated with the indication of effective power radiatable to the network node for each of the plurality of selectively-activatable antenna panels; and,
   selecting and configuring at least one of the selectively-activatable antenna panels to be used for transmission of the signal to the network node from which the at least one downlink signal is received in response to the calculated indication of power consumption.

2. The apparatus according to claim 1, wherein, when executed by the at least one processor, the instructions cause the apparatus to select a transmission-capable antenna panel associated with the calculated indication of power consumption indicative of the lowest power consumption.

3. The apparatus according to claim 1, wherein, when executed by the at least one processor, the instructions cause the apparatus to select a transmission-capable antenna panel associated with the calculated indication of power consumption indicative of the lowest power consumption, subject to the determined indication of effective power radiatable by that antenna panel being above a preselected threshold.

4. The apparatus according to claim 1, wherein, when executed by the at least one processor, the instructions cause the apparatus to select an antenna panel which differs from a selectively-activatable antenna panel selected for reception of the at least one downlink signal.

5. The apparatus according to claim 1, wherein, when executed by the at least one processor, the instructions cause the apparatus to determine, from a stored correlation for an antenna panel, an indication of power consumption associated with the determined indication of effective power radiatable to the network node for that antenna panel.

6. The apparatus according to claim 5, wherein the stored correlation comprises an indication of power consumption according to antenna panel, antenna beam configuration and/or beam steering angle.

7. The apparatus according to claim 1, wherein, when executed by the at least one processor, the instructions cause the apparatus to perform: selecting at least one of the plurality of the selectively-activatable antenna panels to be used for reception of a communication signal in dependence upon the obtained signal reception information related to at least one downlink signal received by the user equipment.

8. The apparatus according to claim 1, wherein, when executed by the at least one processor, the instructions cause the apparatus to perform: selecting the reception antenna panel by at least selecting whether each of the selectively-activatable panels is to be one of active and inactive in response to whether the signal reception information related to the at least one downlink signal received by a user equipment has passed a predetermined threshold.

9. The apparatus according to claim 8, wherein the threshold comprises a threshold relating to received signal strength at each selectively-activatable reception antenna panel.

10. The apparatus according to claim 1, wherein, when executed by the at least one processor, the instructions cause the apparatus to perform: selecting the reception antenna panel on which to receive the communication signal by at least selecting the selectively-activatable antenna panel which is determined to have the best received signal strength.

11. The apparatus according to claim 1, wherein received signal strength is determined in dependence upon one or more of: reference signal received power, signal to noise ratio and/or signal to interference and noise ratio.

12. The apparatus according to claim 1, wherein the signal reception information may be obtained from at least one of: a sensor on the user equipment; radio measurement of the at least one downlink signal received by the user equipment using the at least one reception antenna panel; and information from the network node providing the at least one downlink signal.

13. The apparatus according to claim 1, wherein the signal reception information comprises an indication of signal quality of the at least one downlink signal received by the user equipment using the at least one reception antenna panel and optionally wherein the indication of signal quality comprises at least one of: a reference signal received power, a reference signal received quality; signal to noise ratio and/or signal to interference and noise ratio.

14. The apparatus according to claim 1, wherein the apparatus comprises the user equipment.

15. A method, comprising
   obtaining signal reception information related to at least one downlink signal received by a user equipment using at least one reception antenna panel of a plurality of selectively-activatable antenna panels;
   determining an indication of effective power radiatable to a network node from which the at least one downlink signal is received, based on the signal reception information related to the at least one downlink signal received by that antenna panel, for each of the plurality of selectively-activatable antenna panels which is configurable to transmit a signal to the network node from which the at least one downlink signal is received;

calculating an indication of power consumption associated with the indication of effective power radiatable to the network node for each of the plurality of selectively-activatable antenna panels; and selecting and configuring at least one of the selectively-activatable antenna panels to be used for transmission of the signal to the network node from which the downlink signal is received in response to the calculated indication of power consumption.

16. A non-transitory computer readable medium comprising program instructions that, when executed by an apparatus, cause the apparatus to perform at least the following:

obtaining signal reception information related to at least one downlink signal received by a user equipment using at least one reception antenna panel of a plurality of selectively-activatable antenna panels;

determining an indication of effective power radiatable to a network node from which the at least one downlink signal is received, based on the signal reception information related to the at least one downlink signal received by that antenna panel for each of the plurality of selectively-activatable antenna panels which is configurable to transmit a signal to the network node from which the at least one downlink signal is received;

calculating an indication of power consumption associated with the indication of effective power radiatable to the network node for each of the plurality of selectively-activatable antenna panels; and selecting and configuring at least one of the selectively-activatable antenna panels to be used for transmission of the signal to the network node from which the downlink signal is received in response to the calculated indication of power consumption.

* * * * *